(12) United States Patent
Chen et al.

(10) Patent No.: US 11,979,738 B2
(45) Date of Patent: May 7, 2024

(54) SCHEMES FOR EFFECTIVELY ESTIMATING USER BEHAVIOR TO ACHIEVE A VARIETY OF AUTOMATIC APPLICATIONS BY DETECTING THE ANGLE OF THE TRANSMITTED SIGNAL TO GENERATE HEAD POSE DIRECTION ESTIMATION

(71) Applicant: PixArt Imaging Inc., Hsin-Chu (TW)

(72) Inventors: Shih-Feng Chen, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/127,671

(22) Filed: Mar. 29, 2023

(65) Prior Publication Data

US 2023/0232181 A1    Jul. 20, 2023

Related U.S. Application Data

(63) Continuation of application No. 16/896,257, filed on Jun. 9, 2020, now Pat. No. 11,647,351.

(51) Int. Cl.
| | |
|---|---|
| *H04W 4/02* | (2018.01) |
| *G06F 3/01* | (2006.01) |
| *G06F 3/16* | (2006.01) |
| *H04S 7/00* | (2006.01) |
| *H04W 4/024* | (2018.01) |
| *H04W 4/029* | (2018.01) |
| *H04W 4/80* | (2018.01) |
| *H04W 12/50* | (2021.01) |

(52) U.S. Cl.
CPC .............. *H04S 7/304* (2013.01); *G06F 3/012* (2013.01); *G06F 3/167* (2013.01); *H04W 4/024* (2018.02); *H04W 4/026* (2013.01); *H04W 4/029* (2018.02); *H04W 4/80* (2018.02); *H04W 12/50* (2021.01)

(58) Field of Classification Search
CPC .......... H04S 7/304; G06F 3/012; G06F 3/013; G06F 3/167; H04W 4/026; H04W 4/024; H04W 4/027; H04W 4/029; H04W 4/0238; H04W 4/80; H04W 12/50; H04W 4/025; H04W 64/00; H04W 64/006; H04W 64/003; H04R 2420/01; H04R 2420/07
See application file for complete search history.

(56) References Cited

U.S. PATENT DOCUMENTS

| | | | | |
|---|---|---|---|---|
| 2015/0379963 | A1* | 12/2015 | Holmanu | ............. G06F 3/1454 345/173 |
| 2018/0091924 | A1* | 3/2018 | Hammerschmidt | .... H04S 7/304 |

* cited by examiner

*Primary Examiner* — Angelica Perez
(74) *Attorney, Agent, or Firm* — Winston Hsu

(57) ABSTRACT

A method of wireless communication locator station to be disposed at specific location includes: detecting rotation angle information of client-based portable device, carried or worn by user, according to specific wireless communication standard between wireless communication locator station and client-based portable device when client-based portable device is within signal range of wireless communication locator station; generating head pose direction estimation according to calculated rotation angle information; and when head pose direction estimation indicates that a user turns face towards wireless communication locator station, sending packet signal from wireless communication locator station to server-based portable device, successfully paired with and security-connected with client-based portable device, so that server-based portable device can transfer packet signal to client-based portable device after receiving packet signal.

8 Claims, 10 Drawing Sheets

US 11,979,738 B2

SCHEMES FOR EFFECTIVELY ESTIMATING USER BEHAVIOR TO ACHIEVE A VARIETY OF AUTOMATIC APPLICATIONS BY DETECTING THE ANGLE OF THE TRANSMITTED SIGNAL TO GENERATE HEAD POSE DIRECTION ESTIMATION

CROSS REFERENCE TO RELATED APPLICATIONS

This application is a continuation application of U.S. application Ser. No. 16/896,257, filed on Jun. 9, 2020. The content of the application is incorporated herein by reference.

BACKGROUND OF THE INVENTION

1. Field of the Invention

The invention relates to an application process for estimating user behavior, and more particularly to a stationary electronic device applied to a Bluetooth locator station, a server-based electronic device, and a client-based electronic device.

2. Description of the Prior Art

Generally speaking, in a conventional wireless communication system such as a global navigation satellite system, an assisted global positioning system, Wireless Local Area Networks (WLAN), 3GPP, Bluetooth, Zigbee communication system, location information of a user may be obtained. However, the conventional wireless communication system cannot effectively detect, estimate, or predict the user's behavior. For example, the conventional system cannot detect whether the user now is interested in contents displayed by a panel of an electronic device at a specific location indoors or at a landmark such as a road sign outdoors. Also, the conventional system cannot detect or estimate whether the user now is watching some landmarks or not. Further, it will be complex and complicated to use eye identification technology to determine whether the user is interested in the displayed contents.

SUMMARY OF THE INVENTION

Therefore one of the objectives of the invention is to provide a novel technical solution capable of effectively estimating or predicting a user's behavior, to solve the above-mentioned problem.

According to embodiments of the invention, the invention provides a method of detecting the angle information (angle of arrival and/or angle of departure) of the signal transmitted between a first electronic device and a second electronic device to periodically or real-timely calculate the rotation angle information of the first electronic device relative to the second electronic device so as to generate head pose direction information to estimate or predict a user's behavior wherein the first electronic device may be wore on the head of the user (but not limited). In an embodiment, either the first electronic device or the second electronic device can support Bluetooth direction finding function and operation.

According to the embodiments, a method of a wireless communication locator station to be disposed at a specific location is disclosed. The method comprises: detecting and calculating rotation angle information of at least one client-based portable device, which is carried or worn by a user, according to a specific wireless communication standard between the wireless communication locator station and the at least one client-based portable device when the at least one client-based portable device is within a signal range of the wireless communication locator station; generating a head pose direction estimation according to the calculated rotation angle information; and when the head pose direction estimation indicates that a user turns a face towards the wireless communication locator station, sending at least one packet signal from the wireless communication locator station to a server-based portable device, which is successfully paired with and security-connected with the at least one client-based portable device, so that the server-based portable device can transfer the at least one packet signal to the at least one client-based portable device after receiving the at least one packet signal.

According to the embodiments, a method applied into a server-based portable device which is successfully paired with and security-connected with at least one client-based portable device that is to be carried or worn by a user, includes: receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station; generating a head pose direction estimation according to the calculated rotation angle information; and when the head pose direction estimation indicates that a user turns a face towards the wireless communication locator station, sending a request from the server-based portable device to the wireless communication locator station to ask for at least one packet signal of the wireless communication locator station which is to be transferred to the at least one client-based portable device.

According to the embodiments, a method applied into a server-based portable device which is successfully paired with and security-connected with at least one client-based portable device that is to be carried or worn by a user, includes: receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station; generating a head pose direction estimation according to the calculated rotation angle information; and when the head pose direction estimation indicates that a user turns a face towards the wireless communication locator station, receiving at least one packet signal transmitted from the wireless communication locator station without sending a request to ask for the at least one packet signal, and then determining whether to transfer the at least one packet signal from the server-based portable device to the at least one client-based portable device according to a data filter policy.

According to the embodiments, a method applied into a server-based portable device which is successfully paired with and security-connected with at least one client-based portable device that is to be carried or worn by a user, includes: receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station; generating a head pose direction estimation according to the calculated rotation angle information; and when the head pose direction estimation indicates that a user turns a face towards the wireless communication locator station, sending at least one audio navigation signal from the server-based portable device to the at least one client-based portable device according to a specific suggestion route, which is generated from a map navigation software/mobile application executed on the server-based portable device based on a user command.

According to the embodiments, a method of a wireless communication locator station to be disposed at a specific location, includes: detecting and calculating first rotation angle information of a first client-based portable device, which is carried or worn by a first user and is successfully paired with and security-connected with a first server-based portable device, according to a specific wireless communication standard between the wireless communication locator station and the first client-based portable device when the first client-based portable device is within a signal range of the wireless communication locator station; generating a first head pose direction estimation according to the first rotation angle information; tracking a first location of the first server-based portable device according to the first head pose direction estimation and signal power transmitted from the first server-based portable device to the wireless communication locator station; detecting and calculating second rotation angle information of a second client-based portable device, which is carried or worn by a second user and is successfully paired with and security-connected with a second server-based portable device, according to the specific wireless communication standard between the wireless communication locator station and the second client-based portable device when the second client-based portable device is within the signal range of the wireless communication locator station; generating a second head pose direction estimation according to the second rotation angle information; tracking a second location of the second server-based portable device according to the second head pose direction estimation and information transmitted from the second server-based portable device to the wireless communication locator station; predicting whether the first server-based portable device and the second server-based portable device will collide with each other according to the tracked first location and the tracked second location; and generating a first alarm signal and a second alarm signal respectively to the first server-based portable device and the second server-based portable device when it is determined that the first server-based portable device and the second server-based portable device will collide with each other.

According to the embodiments, an electronic device to be applied into a wireless communication locator station to be disposed at a specific location includes a processing circuit and a communication circuit. The processing circuit is configured for: detecting and calculating rotation angle information of at least one client-based portable device, which is carried or worn by a user, according to a specific wireless communication standard between the wireless communication locator station and the at least one client-based portable device when the at least one client-based portable device is within a signal range of the wireless communication locator station; and generating a head pose direction estimation according to the calculated rotation angle information. The communication circuit is coupled to the processing circuit, and is used for sending at least one packet signal from the wireless communication locator station to a server-based portable device, which is successfully paired with and security-connected with the at least one client-based portable device when the head pose direction estimation indicates that a user turns a face towards the wireless communication locator station, to make the server-based portable device transfer the at least one packet signal to the at least one client-based portable device after receiving the at least one packet signal.

According to the embodiments, an electronic device used in a server-based portable device which is to be successfully paired with and security-connected with at least one client-based portable device that is to be carried or worn by a user includes a communication unit and a processing unit. The communication unit is configured for receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station. The processing unit is coupled to the communication unit, and is used for generating head pose direction estimation according to the calculated rotation angle information. When the head pose direction estimation indicates that a user turns a face towards the wireless communication locator station, the processing unit controls the communication unit to send a request from the server-based portable device to the wireless communication locator station to ask for at least one packet signal of the wireless communication locator station which is to be transferred to the at least one client-based portable device.

According to the embodiments, an electronic device applied into a server-based portable device which is successfully paired with and security-connected with at least one client-based portable device that is to be carried or worn by a user includes a communication unit and a processing unit. The communication unit is used for receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station. The processing unit is used for generating head pose direction estimation according to the calculated rotation angle information. When the head pose direction estimation indicates that a user turns a face towards the wireless communication locator station, the processing unit controls the communication unit to receive at least one packet signal transmitted from the wireless communication locator station without sending a request to ask for the at least one packet signal, and then determine whether to transfer the at least one packet signal from the server-based portable device to the at least one client-based portable device according to a data filter policy.

According to the embodiments, an electronic device applied into a server-based portable device which is successfully paired with and security-connected with at least one client-based portable device that is to be carried or worn by a user includes a communication unit and a processing unit. The communication unit is used for receiving rotation angle information of the at least one client-based portable device from the at least one client-based portable device, the rotation angle information is calculated by the at least one client-based portable device according to a specific wireless communication standard between a wireless communication locator station disposed at a specific location and the at least one client-based portable device when the at least one client-based portable device is within a signal range of the wireless communication locator station. The processing unit is coupled to the communication unit, and is used for generating head pose direction estimation according to the calculated rotation angle information. When the head pose direction estimation indicates that a user turns a face towards the wireless communication locator station, the processing unit controls the communication unit to send at least one audio navigation signal from the server-based portable device to the at least one client-based portable device according to a specific suggestion route, which is generated from a map navigation software/mobile application executed on the server-based portable device based on a user command.

According to the embodiments, an electronic device of a wireless communication locator station to be disposed at a specific location includes a processing circuit and a communication circuit. The processing circuit is configured for: detecting and calculating first rotation angle information of a first client-based portable device, which is carried or worn by a first user and is successfully paired with and security-connected with a first server-based portable device, according to a specific wireless communication standard between the wireless communication locator station and the first client-based portable device when the first client-based portable device is within a signal range of the wireless communication locator station; and generating a first head pose direction estimation according to the first rotation angle information; tracking a first location of the first server-based portable device according to the first head pose direction estimation and information transmitted from the first server-based portable device to the wireless communication locator station; detecting and calculating second rotation angle information of a second client-based portable device, which is carried or worn by a second user and is successfully paired with and security-connected with a second server-based portable device, according to the specific wireless communication standard between the wireless communication locator station and the second client-based portable device when the second client-based portable device is within the signal range of the wireless communication locator station; generating a second head pose direction estimation according to the second rotation angle information; tracking a second location of the second server-based portable device according to the second head pose direction estimation and information transmitted from the second server-based portable device to the wireless communication locator station; and predicting whether the first server-based portable device and the second server-based portable device will collide with each other according to the tracked first location and the tracked second location. The communication circuit is coupled to processing circuit, and is used for generating a first alarm signal and a second alarm signal respectively to the first server-based portable device and the second server-based portable device when it is determined that the first server-based portable device and the second server-based portable device will collide with each other.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of detecting the angle information (including angle of arrival and/or angle of departure) of a signal transmitted between two or more electronic devices to calculate rotation angle information of an electronic device of a user relative to another electronic device so as to generate a head pose direction estimation of the user relative to the another electronic device, to effectively estimate or predict the user's behavior to achieve automatically playing favorite advertisements, navigation voice guidance, and/or traffic alarms for the user.

Figure 1:
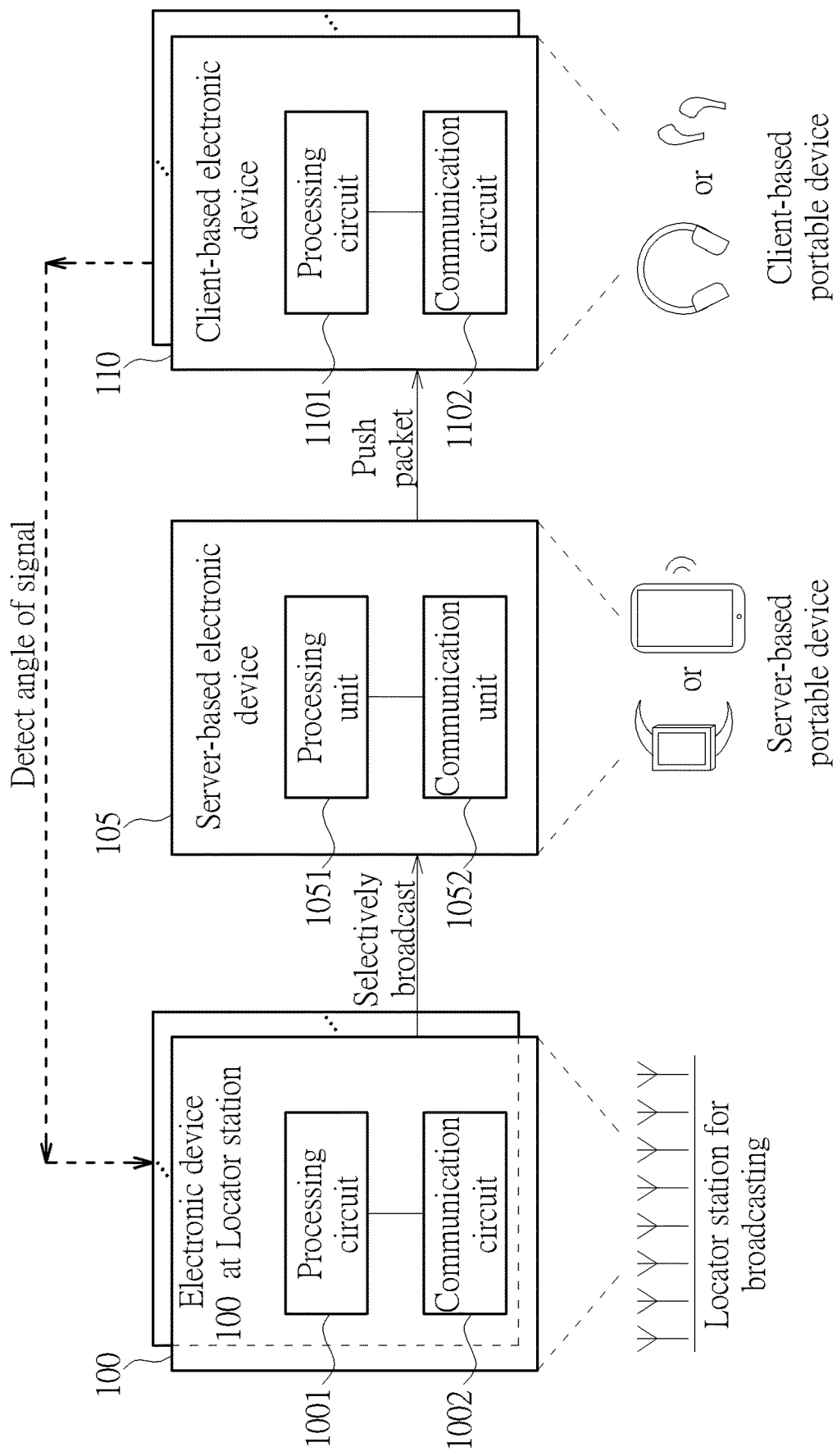
FIG. 1 is a diagram showing an example of a communication system such as a Bluetooth communication system according to an embodiment of the invention.

FIG. 1 is a diagram showing an example of a communication system such as a Bluetooth communication system according to an embodiment of the invention. As shown in FIG. 1, the communication system comprises one or more electronic devices 100 (i.e. stationary-based electronic device(s)) respectively disposed at specific identical or different stationary location(s) and used as wireless communication locator station such as Bluetooth locator station(s), an server-based electronic device 105 applied into a server-based portable device such as a portable/mobile electronic device carried or worn on a user, e.g. smart watch/bracelet/phone device, and one or more client-based electronic devices 110 respectively applied into and disposed in one or more client-based portable devices such as headset(s), headphone(s), or earphones (but not limited). The server-based electronic device 105 and the client-based electronic devices 110 mean that these devices have been paired with each other and are security-connected via a wireless communication standard such as Bluetooth communication standard wherein the server-based electronic device 105 is used as a server or master device while the client-based electronic device(s) 110 is/are client or slave device(s) for such server or master device.

In one embodiment, for example, the electronic device(s) 100 of specific stationary location(s) may be used for selectively or repeatedly broadcasting identical/different advertisement data contents (but not limited) for persons such as passersby or pedestrians. In addition, each stationary-based electronic device 100 applied into a Bluetooth locator station (but not limited) may be implemented with one or more antennas as shown in FIG. 1 (but not limited) and supports the Bluetooth communication standard and/or other wireless communication standard(s) such as wireless networking communication of IEEE 802.11 family of standards or the standard for wireless broadband communication for portable/mobile/wearable device(s) which may have been paired with the stationary-based electronic device 100 or may be not paired with the stationary-based electronic device 100. That is, the communication circuit 1002 may support Bluetooth communication standard, IEEE 802.11 family of standards, and/or the standard of wireless broadband communication. Each of the electronic devices 100 comprises a processing circuit 1001 and a communication circuit 1002. For Bluetooth communication, even though the stationary-based electronic device 100 is not successfully paired with one or more electronic devices 110, the stationary-based electronic device 100 can use the communication circuit 1002 to detect whether one or more electronic devices 110 become(s) near to and is/are within a signal transmission/reception range of the stationary-based electronic device 100 by detecting the signal strength of the radio-frequency Bluetooth signal(s) sent from the one or more electronic devices 110. Also, the stationary-based electronic device 100 can use the communication circuit 1002 to detect the signal strength of the radio-frequency signals sent from the server-based electronic device 110.

In addition, the stationary-based electronic device 100 can use the communication circuit 1002 to detect the angle(s) of arrival/departure (AOA/AOD) of the radio-frequency signal(s) mentioned above, and the detected angle(s) of arrival/departure is/are transmitted from the communication circuit 1002 to the processing circuit 1001 which is arranged to real-timely determine or calculate the rotation angle information of one or more client-based electronic devices 110 relative to the stationary-based electronic device 100 based on the detected angle(s) of arrival/departure. The processing circuit 1001 is coupled to the communication circuit 1002 and is used for calculating or generating a head pose direction estimation of the user according to the generated rotation angle information. The head pose direction estimation is used to indicate whether the user turns his/her face towards the stationary-based electronic device 100 (i.e. the Bluetooth locator station). When the head pose direction estimation indicates that the user turns his/her face towards the stationary-based electronic device 100 (i.e. the Bluetooth locator station), the processing circuit 1001 controls the communication circuit 1002 to send packet signal(s) having advertisement content data to the server-based electronic device 105 of the server-based portable device from the communication circuit 1002 based on the Bluetooth communication standard, IEEE 802.11 family of standards, and/or the standard of wireless broadband communication. That is, for the example of advertisement broadcasting, the stationary-based electronic device 100 is used to selectively sending advertisements for a user which is facing towards the stationary-based electronic device 100 and may not send advertisements for another user which is not facing towards the stationary-based electronic device 100. For example, the stationary-based electronic device 100 does not broadcast advertisements for a user which is turning back to the stationary-based electronic device 100 or turns the face sideways the stationary-based electronic device 100.

The server-based electronic device 105 for example comprises the processing unit 1051 and the communication unit 1052. The processing unit 1051 for example is a digital processor or may be a central processing unit (CPU) implemented by hardware components, firmware components, software components, or a combination of hardware, firmware, and software components. The communication unit 1052 may comprise a portion of communication circuits capable of communicating with the stationary-based electronic device(s) 100 based on the Bluetooth communication standard, IEEE 802.11 family of standards, or wires broadband communication or mobile communication standard, or a portion of communication circuits capable of communicating with the client-based electronic device(s) 110 based on the Bluetooth communication standard, or may comprise a combination of the above-mentioned portions of communication circuits. In practice, the communication unit 1052 may be a single integrated circuit which supports the Bluetooth communication standard, IEEE 802.11 family of standards, or wireless broadband communication or mobile communication standard. Alternatively, the communication unit 1052 may comprise multiple integrated circuits which respectively support the Bluetooth communication standard for the electronic device(s) 110 and other communication standards for the electronic device (s) 100. This is not intended to be a limitation.

When the communication unit 1052 receives a packet signal having advertisement content data sent from the communication circuit 1002, the processing unit 1051 may control the communication unit 1052 to directly push and transmit/transfer the advertisement content data from the server-based electronic device 105 to the communication circuit(s) 1102 of the electronic device(s) 110 of the client-based portable device(s) by sending Bluetooth packet(s) including the advertisement content data. Alternatively, the processing unit 1051 may control the communication unit 1052 to selectively push and transmit/transfer the advertisement content data from the server-based electronic device 105 to the communication circuit(s) 1102 of the electronic device(s) 110 of the client-based portable device(s) according to at least one user-favorite rule of a data filter policy which can be configured or set by the user in advance. The data filter policy comprises at least one of user-favorite shop information, user-favorite product information, logistics information, purchase history information, on-sale information, user-interest information, and/or user-habit information. For example, the user can configure his/her favorite rule(s) associated of different advertisement type(s) by activating a specific mobile application executed by the processing unit 1051. When a packet is coming, the processing unit 1051 can compare the content type (e.g. advertisement type) of such packet with favorite type(s) recorded in the favorite rule(s), and then may control the communication unit 1052 to push and transmit the advertisement content data of such packet to the client-based electronic device (s) 110 if the advertisement type matches the favorite type(s) or may control the communication unit 1052 not to transmit the advertisement content data to the electronic device(s) 110 if the advertisement type does not match the favorite type(s).

The transmission of advertisement content data from the server-based portable device to the client-based portable device(s) is performed based on the Bluetooth communication standard when the server-based portable device has been successfully paired with the client-based portable device(s); for example, the server-based portable device, e.g. smart watch/bracelet or smart phone device, is successfully paired with one or more client-based portable device(s) such as headphone(s) or earphone(s). For a client-based portable device, when the communication circuit 1102 of its client-based electronic device 110 receives the advertisement content data, which may be formed as a Bluetooth packet, the processing circuit 1101 is arranged for playing audio/voice portion of such advertisement content data for the user. Thus, based on the above operations, once a stationary-based electronic device 100 of a Bluetooth location station detects and determines that a user is facing towards the Bluetooth location station, the user-favorite advertisement content data can be automatically transmitted from the Bluetooth locator station to the server-based portable device and then passed to one or more client-based portable device(s) carried or worn by the user so as to play corresponding audio portion/content for the user. In a preferred scenario, it is significantly convenient and not needed for the user to click any physical or visual/virtual button or any gestures.

Figure 2:
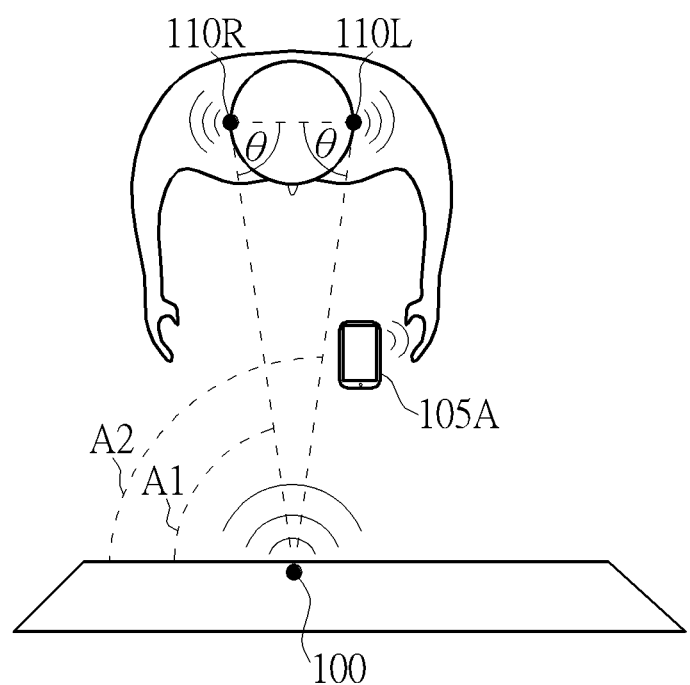
FIG. 2 is a diagram showing an example of broadcasting favorite advertisement content data according to the embodiment of FIG. 1.

To more clearly describe the operation of detecting the angle(s) of Bluetooth signal(s) to determine/generate the head pose information direction estimation, refer to FIG. 2. FIG. 2 is a diagram showing an example of broadcasting favorite advertisement content data according to the embodiment of FIG. 1. As shown in FIG. 2, the client-based portable devices such as headphones or earphones 110L and 110R are respectively worn by a user in FIG. 2, and in this example the user also operates or carries a server-based portable device 105 on his/her hand. The stationary-based electronic device 100 is disposed at a Bluetooth location station and is used for detecting the angle of arrival (AOA) or angle of departure (AOD), e.g. A1 and A2, of signals of the two client-based portable devices 110L and 110R, and can real-timely calculate different rotation angle information based on the angles A1 and A2, so as to generate one or more head pose direction estimations; for example, a head pose direction estimation may be generated based the rotation angle information of angle A1, the rotation angle information of angle A2, or rotation angle information of a combination of angles A1 and A2. Based on the head pose direction estimation(s), the stationary-based electronic device 100 can determine whether such user turns the face towards the stationary-based electronic device 100. For example, when the rotation angle information indicates that the angle of arrival A2 for the client-based portable device 110L for the left ear becomes smaller than a first angle value and the angle of departure A1 for the client-based portable device 110R for the right ear becomes smaller than a second angle value, the stationary-based electronic device 100 can generate a head pose direction estimation which indicates that the user is becoming facing the stationary-based electronic device 100 and then accordingly the stationary-based electronic device 100 can transmit a broadcast packet signal having advertisement content data to the server-based portable device 105A to push advertisement content data for the user even though the stationary-based electronic device 100 is not paired with any of the server-based portable device 105A and client-based portable devices 110L and 110R. It should be noted that the stationary-based electronic device 100 can detect the angle of signal of a single one client-based portable device such as 110L/110R for the left/right ear to decide whether the user is becoming facing to the Bluetooth location station.

Figure 3:
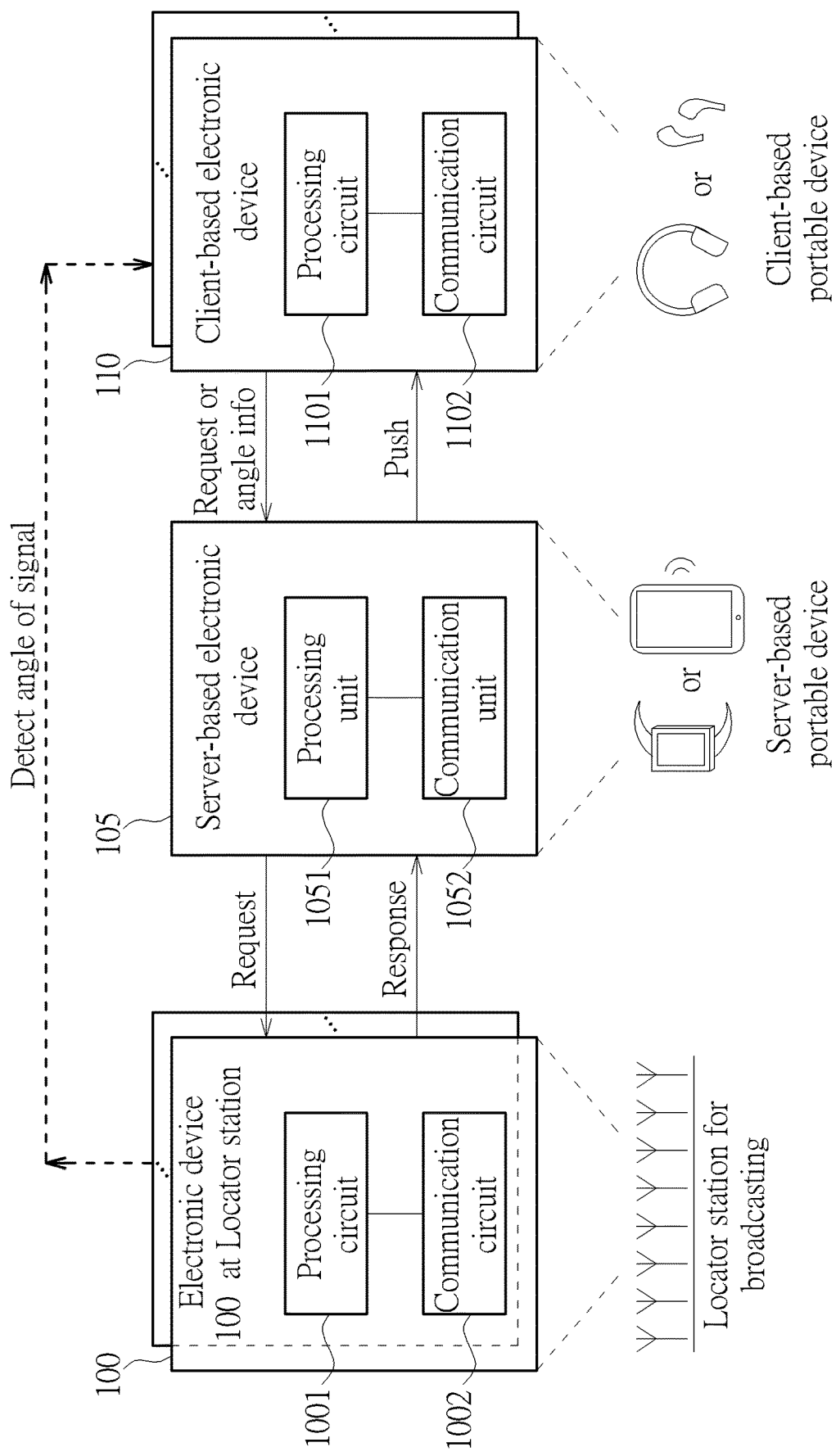
FIG. 3 is a diagram of showing an example of a communication system such as a Bluetooth communication system according to another embodiment of the invention.

In another embodiment, the operation of detecting the angle(s) of arrival/departure of the Bluetooth signal can be performed by the client-based electronic device(s) 110 of the client-based portable device(s). Refer to FIG. 3. FIG. 3 is a diagram of showing an example of a communication system such as a Bluetooth communication system according to another embodiment of the invention. In this embodiment, the client-based electronic device(s) 110 can use the communication circuit 1102 to detect whether the one or more client-based portable devices become(s) near to and is/are within the signal transmission/reception range of the electronic device(s) 100 by detecting the signal strength of the radio-frequency Bluetooth signal(s) sent from the electronic device(s) 100 respectively applied into one or more Bluetooth location stations. The client-based electronic device 110 can use the communication circuit 1102 to detect the angle(s) of arrival/departure (AOA/AOD) of the radio-frequency signal(s) mentioned above, and the detected angle(s) of arrival/departure is/are transmitted from the communication circuit 1102 to the processing circuit 1101 which is arranged to determine or calculate the rotation angle information of the client-based electronic device relative to one or more electronic devices 100 based on the detected angle(s) of arrival/departure, so as to generate the head pose direction estimation(s) for Bluetooth locator station(s) based on the rotation angle information. When a head pose direction estimation indicates that the user turns his/her face towards a stationary-based electronic device 100 (i.e. the Bluetooth locator station), the processing circuit 1101 of the client-based electronic device 110 controls the communication circuit 1102 to send a request signal (for requesting advertisement content data of the Bluetooth locator station) from the client-based portable device to the server-based electronic device 105 of the server-based portable device based on the Bluetooth communication standard. The client-based electronic device 110 does not send the request signal to the server-based electronic device 105 when the user is turning back on the stationary-based electronic device 100 or turns the face sideways the stationary-based electronic device 100.

Then, after receiving the request signal from the client-based electronic device 110, the processing unit 1051 controls the communication unit 1052 to generate a corresponding request signal/packet from the server-based electronic device 105 to the stationary-based electronic device 100. After receiving such corresponding request signal/packet, the processing circuit 1001 controls the communication circuit 1002 to send response packet(s) including the advertisement content data requested by the client-based portable device from the stationary-based electronic device 100 to the server-based electronic device 105 based on the Bluetooth communication standard, IEEE 802.11 family standards, or wireless broadband communication standards. Then, the processing unit 1051 controls the communication unit 1052 to generate and send a corresponding response signal/packet including the advertisement content data from the server-based portable device to the client-based portable device (s) based on the Bluetooth communication standard.

For the client-based portable device, when the communication circuit 1102 of its client-based electronic device 110 receives the advertisement content data of corresponding response signal/packet, the processing circuit 1101 is arranged for playing the advertisement content data, e.g. audio/voice portion/content, for the user. Thus, based on the above operations, once the client-based electronic device 110 of the client-based portable device such as a Bluetooth headphone/earphone (but not limited) detects and determines that the user is turning the face towards a particular Bluetooth locator station, the user-favorite advertisement contents at such particular Bluetooth locator station can be automatically transmitted from such Bluetooth locator station to the server-based portable device such as smart watch/phone and then passed to the Bluetooth headphone/earphone carried or worn by the user so as to play corresponding audio content for the user. In a preferred scenario, it is very convenient and is not needed for the user to click any physical or visual/virtual button or any gestures.

Further, in other embodiments, when receiving the response signal/packet from the stationary-based electronic device 100, the processing unit 1051 of server-based electronic device 105 may compare the content type (e.g. advertisement type) of such response signal/packet with at least one user-favorite rule which can be configured or set by the user in advance. The processing unit 1051 may control the communication unit 1052 to generate and send the corresponding response signal/packet including the advertisement content data to the client-based electronic device(s) 110 if such content type matches one of the favorite type(s) or may control the communication unit 1052 not to transmit the advertisement content data if the content type does not match any of the favorite type(s).

Alternatively, in one embodiment, the client-based electronic device 110 of each client-based portable device can real-timely or periodically transmit the angle information (including angle of arrival/departure between one stationary-based electronic device 100 of a Bluetooth locator station and such client-based electronic device 110) to the server-based electronic device 105 if the client-based electronic device 110 becomes within the signal transmission/reception range of the stationary-based electronic device 100. When receiving the angle information from the client-based electronic device 110, the processing unit 1051 calculates the rotation angle information of the client-based electronic device 110 so as to generate a head pose direction estimation which is used to indicate whether the user is facing the Bluetooth locator station. The processing unit 105 may control the communication unit 1052 to generate and send the corresponding request signal/packet mentioned above to the stationary-based electronic device 100 if the head pose direction estimation indicates that the user now is facing towards the Bluetooth locator station. The processing unit 105 controls the communication unit 1052 not to generate and send the corresponding request signal/packet if the head pose direction estimation indicates that the user is not facing towards the Bluetooth locator station. The other operations are similar and are not detailed for brevity.

Further, in other embodiments, the user can configure his/her favorite rule(s) of advertisements by activating a specific mobile application executed by the processing unit 1051, and the configured favorite rule(s) can be recorded or stored in a register or a memory device within the server-based portable device. When a generated head pose direction estimation can be used to indicate that the user would like to or tries to use/operate the server-based portable device, the user-favorite advertisements can be automatically transmitted, pushed, and played for the user via the communication between the Bluetooth locator station and server-based portable device and the communication between the server-based portable device and client-based portable device.

Figure 4:
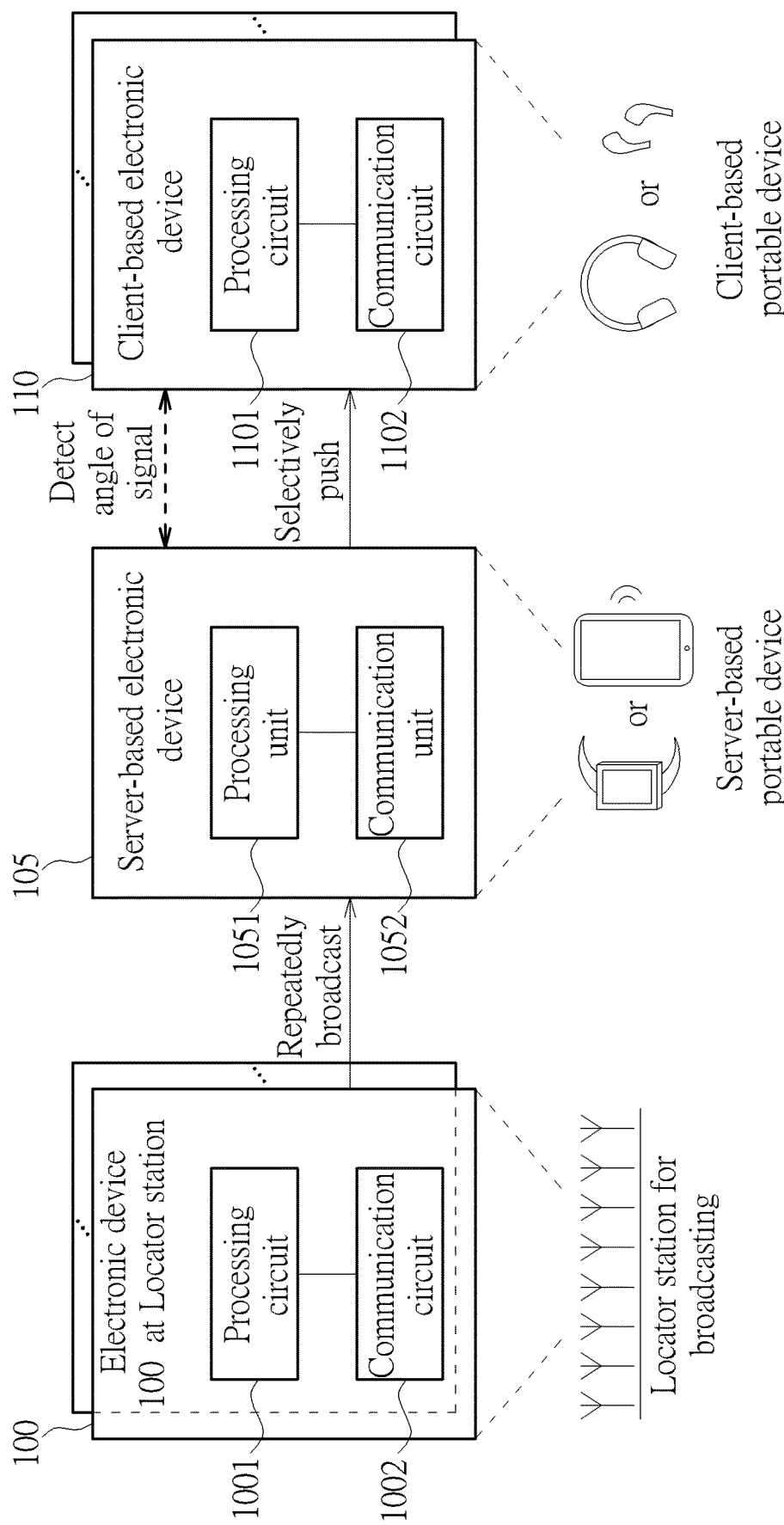
FIG. 4 is a diagram showing an example of a communication system such as a Bluetooth communication system according to another embodiment of the invention.

Refer to FIG. 4. FIG. 4 is a diagram showing an example of a communication system such as a Bluetooth communication system according to another embodiment of the invention. As shown in FIG. 4, for example, in one embodiment, the specific stationary location(s) may be used for periodically broadcasting identical/different advertisements (but not limited) for persons such as passersby or pedestrians. When the server-based portable device is near to or becomes within the signal transmission/reception range of the Bluetooth locator station, the advertisement signal/packet, periodically broadcasted, can be successfully received by the server-based electronic device 105. The processing unit 1051 can detect and determine the angle information (including angle of arrival/departure of the signal communicated between the server-based electronic device 105 and at least one client-based electronic device 110) to generate the rotation angle information of the at least one client-based electronic device 110 relative to the server-based electronic device 105. Such rotation angle information can be used to generate a head pose direction estimation which can indicate whether the user becomes faced towards the server-based portable device 105 and can also estimate or indicate whether the user would like to operate/use the server-based portable device. When the head pose direction estimation indicates that the user now would like to use the server-based portable device, the processing unit 1051 is arranged to compare the content type (e.g. advertisement type) of the currently received broadcast signal/packet from the stationary-based electronic device 100 with the user-favorite rule(s) recorded in the server-based electronic device 105. If the content type matches one of the user-favorite rule(s), the processing unit 1051 controls the communication unit 1052 to generate and send a corresponding signal/packet so as to push and transmit the advertisement content data to the at least one client-based electronic device 110 for automatically playing audio/voice portion/content of user-favorite advertisements for the user. Alternatively, in other examples, detecting and determining the angle of arrival/departure to calculate the rotation angle information to generate a head pose direction estimation can be performed by the at least one client-based electronic device 110. When the head pose direction estimation indicates that the user now would like to use or may try to use the server-based portable device, the processing circuit 1101 controls the communication circuit 1102 to send a notification signal to the server-based portable device, and then after receiving the notification signal the processing unit 1051 can compare the content type (e.g. advertisement type) of the currently received broadcast signal/packet with the user-favorite rule(s) recorded in the server-based electronic device 105 to push and transmit user-favorite advertisements to the client-based electronic device(s) 110 and not to push and transmit unfavorite advertisements.

Figure 5:
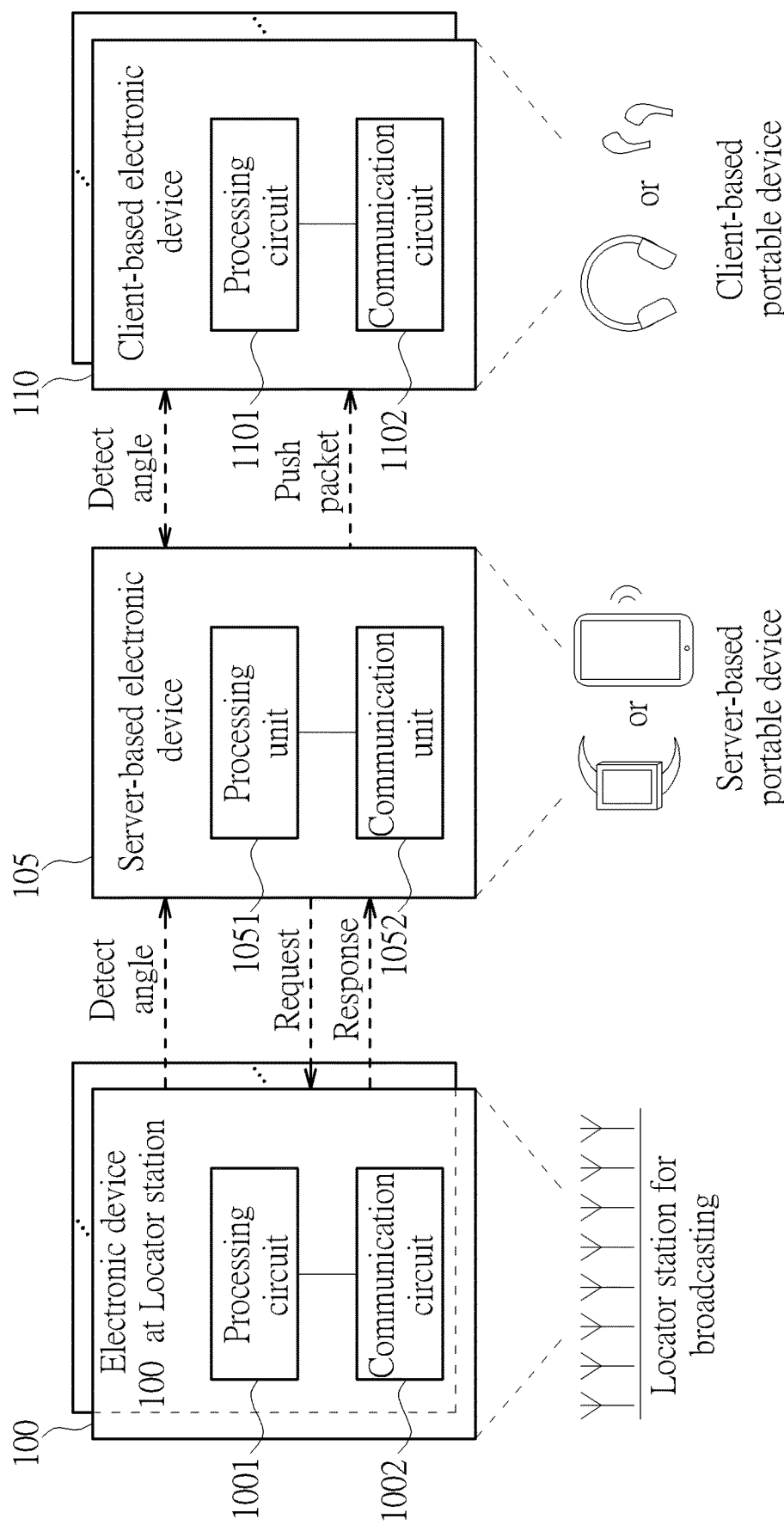
FIG. 5 is a diagram of an example of a communication system such as a Bluetooth communication system according to another embodiment of the invention.

Refer to FIG. FIG. 5 is a diagram of an example of a communication system such as a Bluetooth communication system according to another embodiment of the invention. As shown in FIG. 5, for example, the processing unit 1051 of server-based electronic device 105 can detect the angle information (including angle of arrival and/or departure) of the signal transmitted from the communication circuit 1002 of stationary-based electronic device 100, and also can detect the angle information (including angle of arrival and/or departure) of the signal transmitted from the communication circuit(s) 1102 of client-based electronic device(s) 110 and/or can receive such angle information sent from the client-based electronic device(s) 110. Then, based on the detected angle information and/or received angle information, the processing unit 1051 can real-timely calculate and generate the rotation angle information of the client-based electronic device(s) 110 relative to the stationary-based electronic device 100 (i.e. Bluetooth locator station) to generate a head pose direction estimation. When the head pose direction estimation indicates that the user turns his/her face towards the Bluetooth locator station (i.e. the stationary-based electronic device 100), the processing unit 1051 controls the communication unit 1052 to send a request signal/packet to the stationary-based electronic device 100. After receiving the request signal/packet, the processing circuit 1001 controls the communication circuit 1002 to send a response signal/packet including the advertisement content data to the server-based electronic device 105. Then the processing unit 1051 of server-based electronic device 105 can compare the content type of such advertisement content data with the user-favorite rule(s) recorded in the server-based electronic device 105 to determine whether to push and transmit the advertisement content to the client-based electronic device(s) 110 or to discard/ignore the advertisement content without transmitting the advertisement content. Alternatively, in another example, the processing unit 1051 may control the communication unit 1052 to directly push and transmit the advertisement content to the client-based electronic device(s) 110 without comparing the content type with the user-favorite rule (s) once receiving the advertisement content data from the stationary-based electronic device 100 of the Bluetooth locator station.

Figure 6:
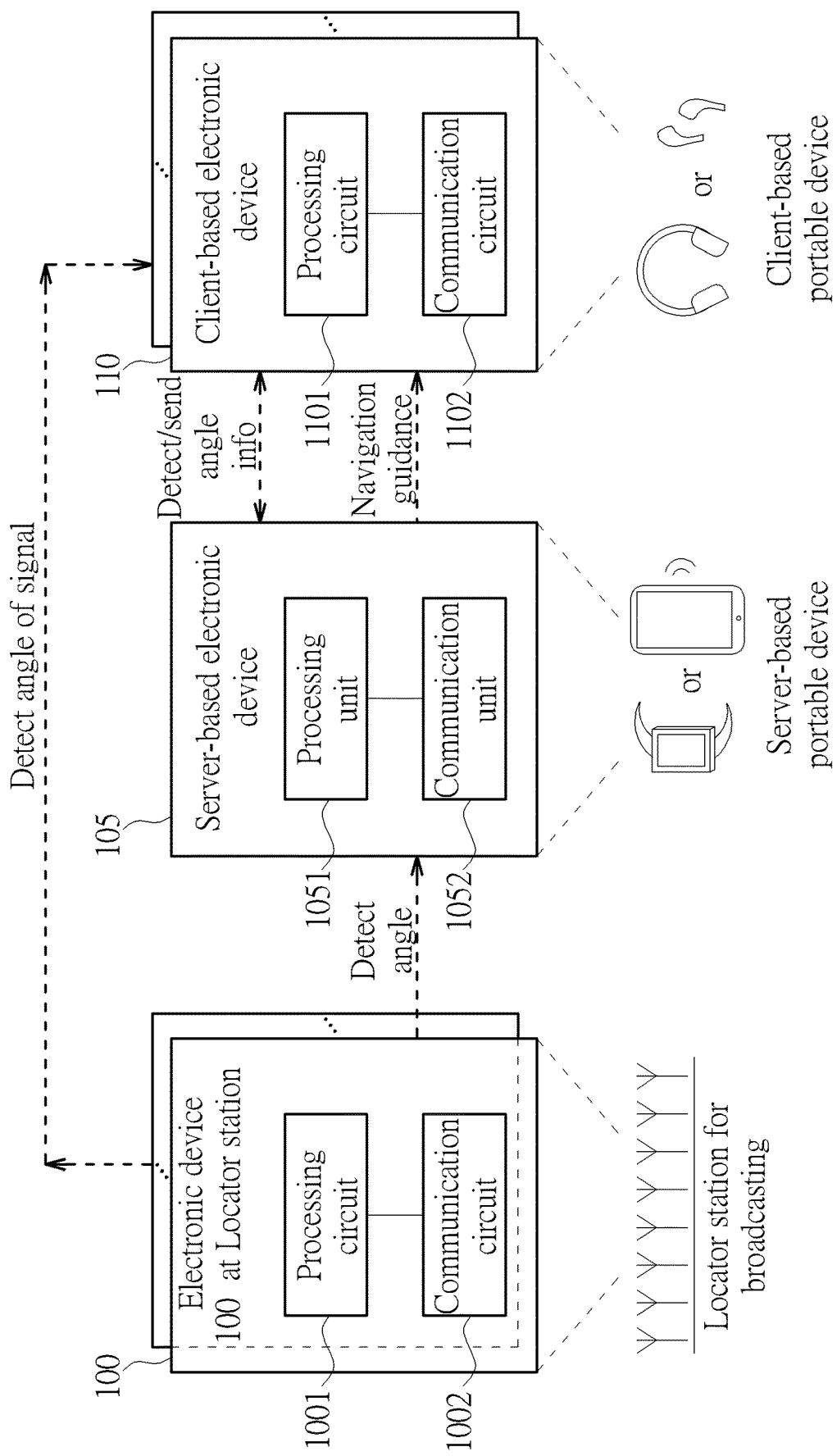
FIG. 6 is a diagram of an example of a communication system such as a Bluetooth communication system according to another embodiment of the invention.

Additionally, in other embodiments, the operation of determining whether the user is facing towards the Bluetooth locator station based on the head pose direction estimation generated by the above-mentioned determined rotation angle information can be applied into real-timely sending or playing navigation voice guidance for the user. Refer to FIG. 6. FIG. 6 is a diagram of an example of a communication system such as a Bluetooth communication system according to another embodiment of the invention. The processing unit 1051 of server-based electronic device 105 can periodically detect the angle information (angle of arrival and/or departure) of the signal transmitted from the communication circuit 1002 of the Bluetooth locator station when the server-based electronic device 105 is within the signal transmission/reception range of the Bluetooth locator station. Alternatively, the processing unit 1051 of server-based electronic device 105 can detect the angle information (angle of arrival and/or departure) of the Bluetooth signal transmitted from the communication circuit(s) 1102 of the client-based electronic device (s) 110 when the user carries or wears the server-based electronic device 105 and client-based electronic device(s) 110. Alternatively, the processing circuit 1101 of each client-based electronic device 110 can detect the angle information (angle of arrival and/or departure) of the Bluetooth signal transmitted from the communication circuit 1002 of the Bluetooth locator station when the client-based electronic device 110 is within the signal transmission/reception range of the Bluetooth locator station, and then controls the communication circuit 1102 to send the detected angle information to the server-based electronic device 105.

Then, the processing unit 1051 for example can real-timely calculate and determine the rotation angle information of one or more client-based electronic devices 110 relative to the Bluetooth locator station based on the detected angle information of the signal between the stationary-based electronic device 100 and server-based electronic device 105 and the detected angle information of the signal between the server-based electronic device 105 and client-based electronic device (s) 110, so as to generate a head pose direction estimation to provide a navigation voice guidance for the user in some scenarios. For instance, when the user is using or operating a map navigation application running on the server-based portable device such as a smart phone/watch, even though the map navigation application cannot instantly show a correct walking/driving direction (e.g. the navigation arrow) of a specific route on the map navigation application or the map navigation application shows an erroneous walking/driving direction, the processing unit 1051 can control the communication unit 1052 to generate and send a navigation voice guidance signal to the client-based electronic device(s) 110 when the currently generated head pose direction estimation indicates that the user is facing towards the Bluetooth locator station, so that the client-based electronic device(s) 110 can play voice navigation guidance for the user in advance no matter whether the map navigation application shows the correct/erroneous navigation arrow for the specific route later; the specific route is a suggestion route which is generated from a map navigation software/mobile application executed on the server-based portable device based on a user command; however, this is not intended to be a limitation. Also, the user can still correctly move forward to walk/drive a vehicle for the specific route. This operation can correctly perform turn-by-turn navigation without using audio navigation of the map navigation software/mobile application or can correctly perform turn-by-turn navigation even though the map navigation application shows an erroneous navigation arrow. In other embodiments, the currently determined head pose direction estimation based on the rotation angle information may indicate that the locator station is at the right, left, or back direction relative to the user. If the locator station for example is at a location on the specific route, then the processing unit 1051 can also control the communication unit 1052 to generate and send a voice navigation guidance signal to the client-based electronic device(s) 110 so that the client-based electronic device(s) 110 can play audio navigation guidance for the user in advance and the user can turn right/left or move backward to correctly walk/drive a vehicle for the specific route.

Figure 7:
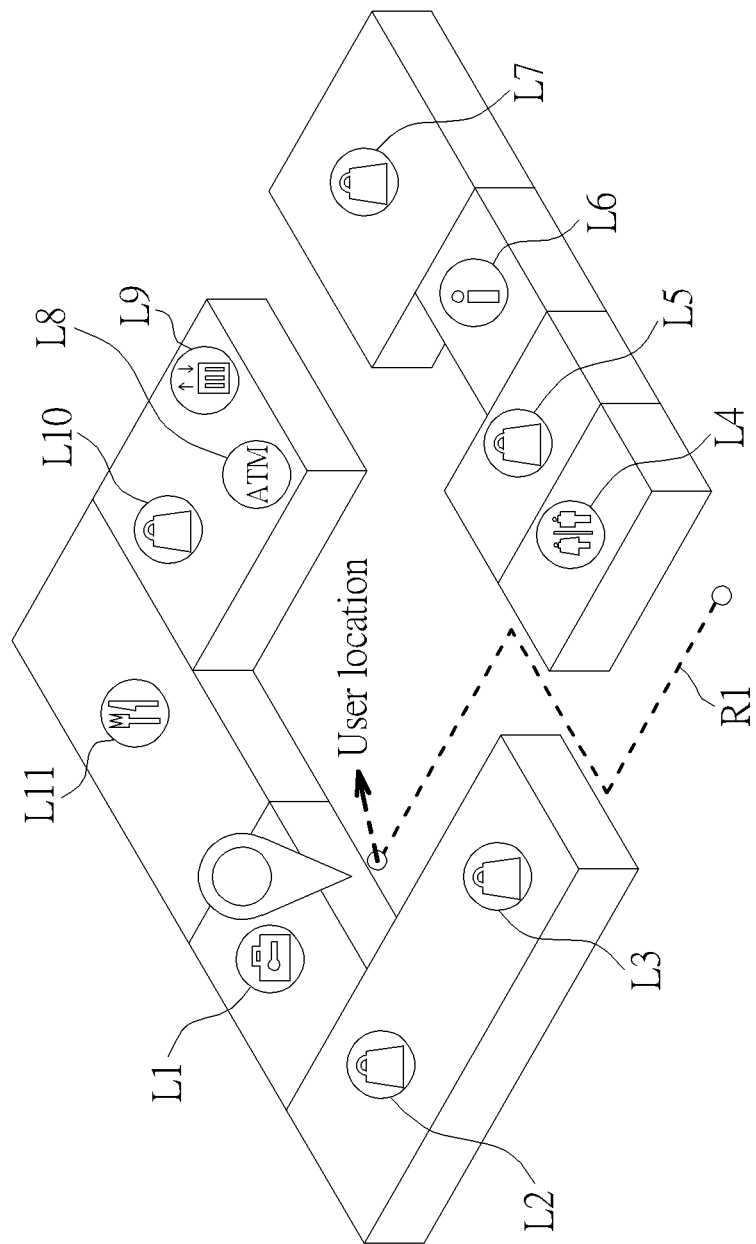
FIG. 7 is a diagram showing an example of indoor navigation according to the embodiment of FIG. 6.
Figure 8:
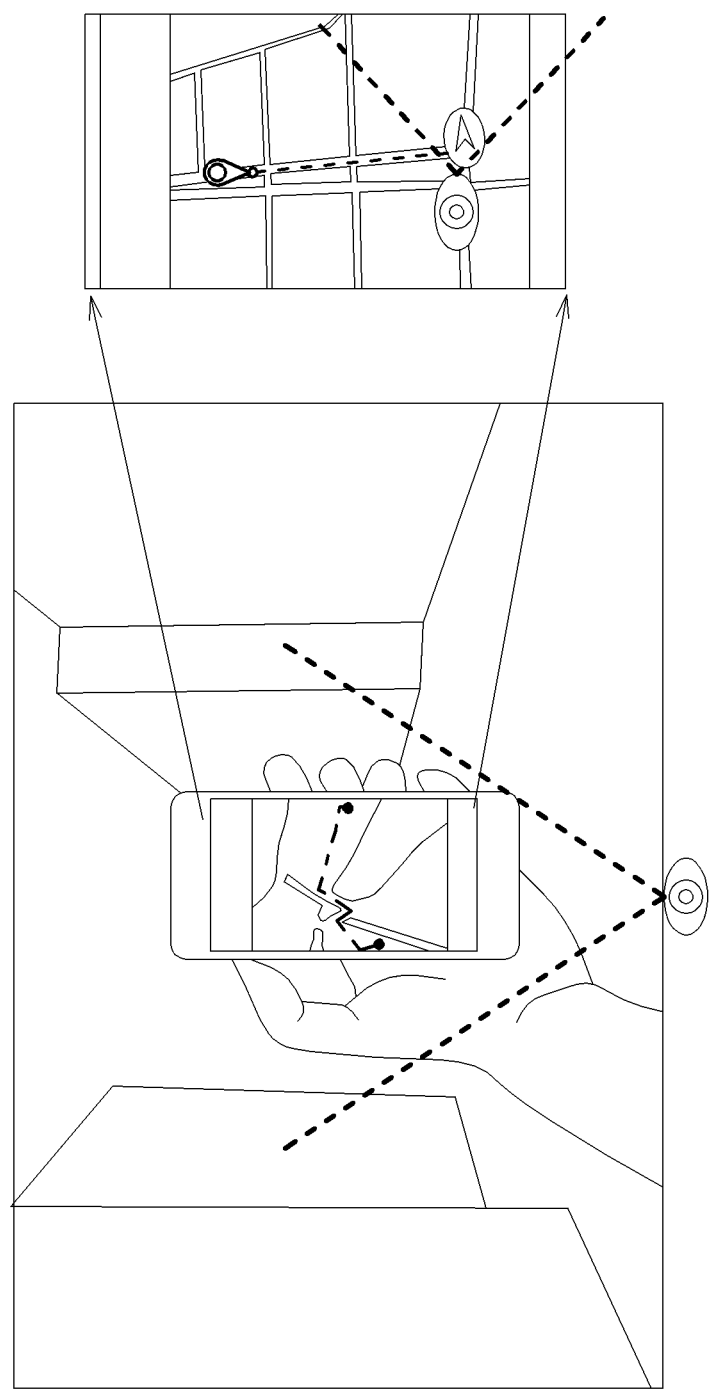
FIG. 8 is a diagram showing an example of outdoor navigation according to the embodiment of FIG. 6.

FIG. 7 and FIG. 8 are diagrams respectively showing an example of indoor navigation and an example of outdoor navigation according to the embodiment of FIG. 6. As shown in FIG. 7, for example, one or more stationary-based electronic devices 100 (used to be disposed at a locator station) may be respectively disposed at one or more locator stations such as L1-L11 at different locations. R1 indicates a walking route of a user. Based on the embodiment of FIG. 6, either the server-based electronic device 105 or client-based electronic device(s) 110, used by a user at the user location can be used to generate a head pose direction estimation which can indicate that the user is facing towards a Bluetooth locator station L4 by detecting and calculating the rotation angle information mentioned above real-timely, and then the server-based electronic device 105 can send a Bluetooth packet of voice guided navigation to the client-based electronic device(s) 110, so that the client-based electronic device(s) 110 can play corresponding audio content of such voice guided navigation for the user to give the user navigation guidance; for example, when the user is facing towards the Bluetooth locator station L4, the server-based electronic device 105 can send the Bluetooth packet of voice guided navigation to give hints about moving forward. Similarly, the user is back to the Bluetooth locator station L1, and a generated head pose direction estimation can also indicate that the user now is back to the Bluetooth locator station L1. The server-based electronic device 105 can also send a Bluetooth packet of voice guided navigation to give hints about moving forward for the user based on such generated head pose direction estimation. This operation can be applied into different locator stations such as L2, L3, L10, L7, and so on; this is not meant to be a limitation of the invention.

Additionally, as shown in FIG. 7, a user may operate the server-based electronic device 105 such as smart phone to use a map navigation application to find a specific route, and in this case the processing unit 1051 of server-based electronic device 105 can detect the angle information between itself and any client-based electronic device(s) 110 such as earphone or headphone wore by the user and detect the angle information between itself and any neighboring Bluetooth locator station(s), to calculate the rotation angle information of the client-based electronic device(s) 110 relative to the neighboring Bluetooth locator station(s) so as to generate head pose direction estimation(s) relative to the neighboring Bluetooth locator station(s), so that the processing unit 1051 can determine that a neighboring Bluetooth locator station on the route may be at the left (left hand side) of the user and then can send a Bluetooth packet to client-based electronic device (s) 110 to make the client-based electronic device(s) 110 play voice navigation messages for the user; for example, the voice navigation messages may give hints about turning left for the user. However, this is not meant to be a limitation.

Figure 9:
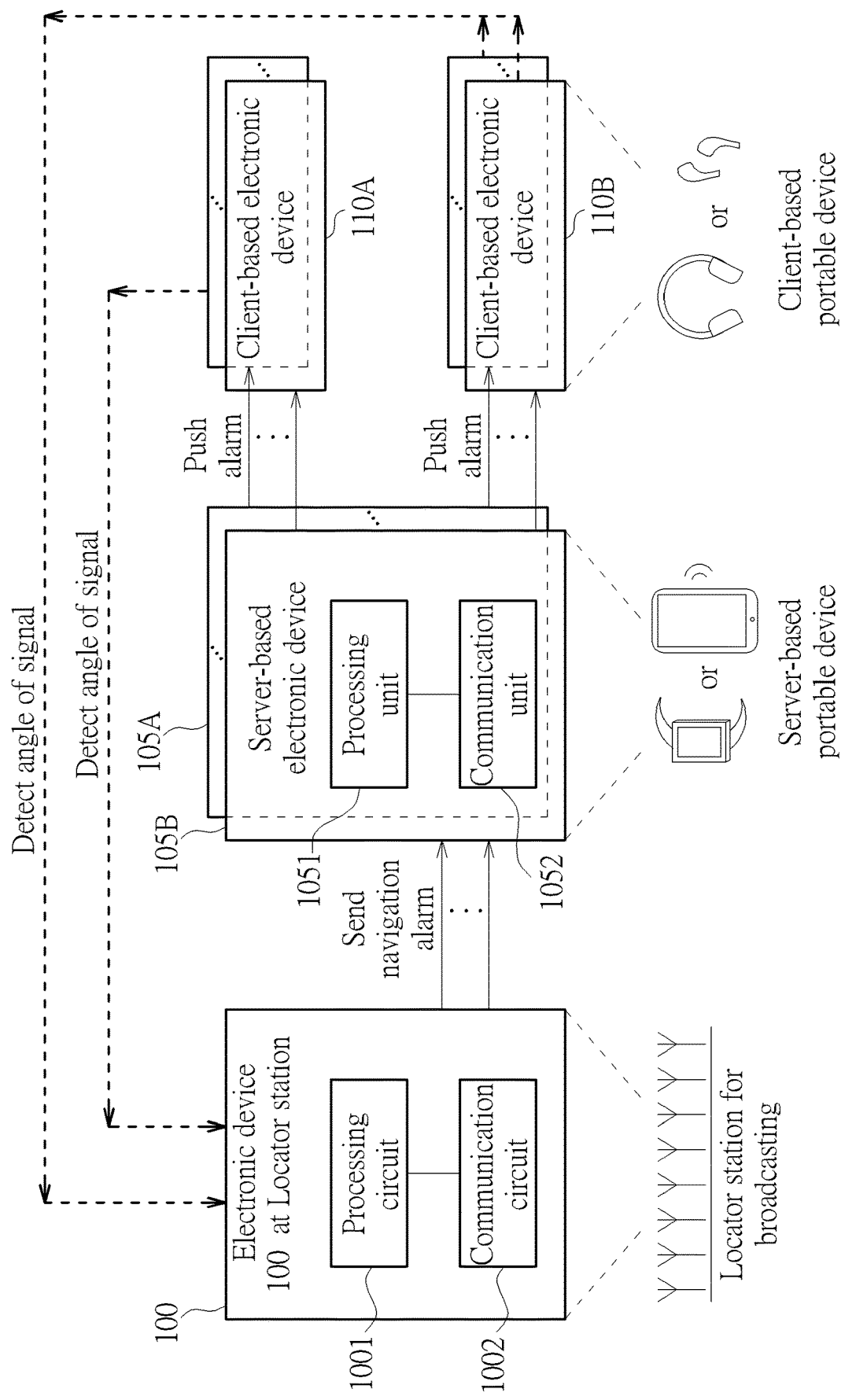
FIG. 9 is a diagram of an example of a communication system such as a Bluetooth communication system according to another embodiment of the invention.
Figure 10:
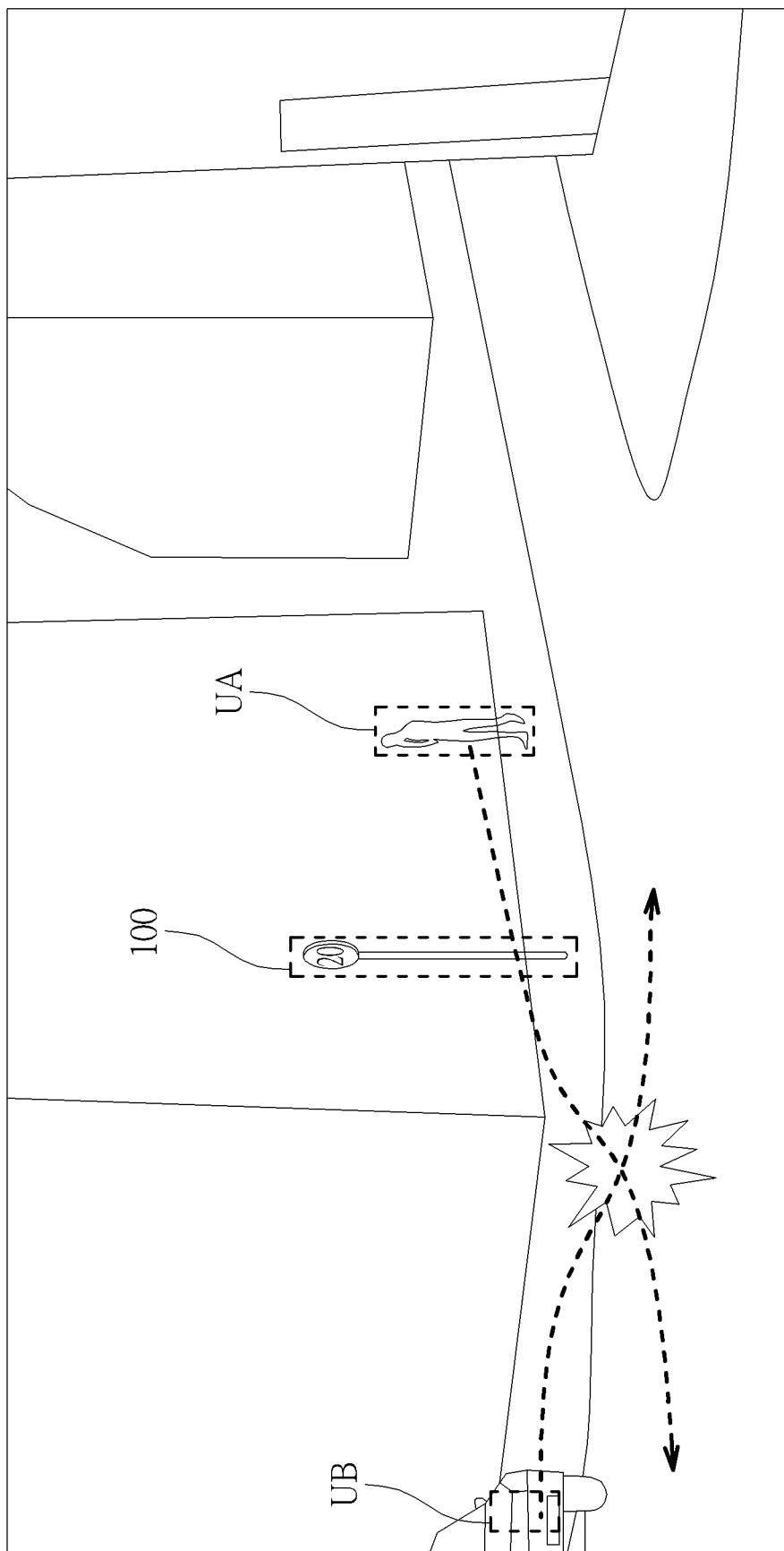
FIG. 10 is a diagram showing the example of the stationary-based electronic device disposed at an intersection according to the embodiment of FIG. 9.

Further, in other embodiments, the stationary-based electronic device 100 disposed at a particular location such as an intersection/crossroad (but not limited) can be used to detect the angle information of the client-based electronic devices respectively wore by different users/drivers to give traffic alarms for the different users/drivers so as to achieve collision avoidance. Refer to FIG. 9 in conjunction with FIG. 10. FIG. 9 is a diagram of an example of a communication system such as a Bluetooth communication system according to another embodiment of the invention. FIG. 10 is a diagram showing the example of the stationary-based electronic device 100 disposed at an intersection according to the embodiment of FIG. 9. For example, a stationary-based electronic device 100 may be disposed at a specific road sign of an intersection in FIG. 10, a user UA (shown in FIG. 10) may use the server-based electronic device 105A and wears/carries the client-based electronic device(s) 110A in FIG. 9 and then will walk through such intersection. A driver for example may use the server-based electronic device 105B and wears/carries the client-based electronic device (s) 110B in FIG. 9 and then will drive a vehicle through such intersection. Without detecting the angle information mentioned above to generate head pose direction estimations to predict the routes of the user UA and driver UB, a traffic accident will occur. In practice, the stationary-based electronic device 100 disposed at the specific road sign is arranged to periodically detect the angle information (angle of arrival/departure) of the signal(s) transmitted by the client-based electronic device(s) of the user UA to calculate the rotation angle information for the user UA so as to generate a first head pose direction estimation to predict the walking route of the user UA. For example, based on the first head pose direction estimation and the detected signal power transmitted from the server-based portable device 105A (or client-based electronic device(s) 110A), the stationary-based electronic device 100 can track locations of the server-based portable device 105A (or client-based electronic device(s) 110A). Similarly, the stationary-based electronic device 100 can also periodically detect the angle information (angle of arrival/departure) of the signal(s) transmitted by the client-based electronic device (s) of the driver UB to calculate the rotation angle information for the driver UB so as to generate a second head pose direction estimation to predict the driving route of the driver UB. Based on the second head pose direction estimation and the detected signal power transmitted from the server-based portable device 105B (or client-based electronic device(s) 110B), the stationary-based electronic device 100 can track locations of the server-based portable device 105B (or client-based electronic device(s) 110B).

For instance, if the first head pose direction estimation of the client-based electronic device(s) 110A indicates that the user UA is facing towards the stationary-based electronic device 100 at the intersection and the stationary-based electronic device 100 also detects that the signal power of the signal transmitted by the client-based electronic device(s) 110A becomes larger, then the processing circuit 100 may predict that the user UA may walk through the intersection. In this situation, if the second head pose direction estimation of the client-based electronic device(s) 110B indicates that the driver UB is facing towards the stationary-based electronic device 100 at the intersection and the stationary-based electronic device 100 also detects that the signal power of the signal transmitted by the client-based electronic device(s) 110B becomes larger, then the processing circuit 100 may predict that the driver UB may drive through the intersection and accordingly may predict or determine that a traffic accident will occur if the user UA and driver UB do not stop.

To avoid this traffic accident in the future, the processing circuit 1001 of stationary-based electronic device 100 at the intersection may control the communication circuit 1002 to respectively generate and send navigation alarm signals to the server-based electronic devices 105A and 105B via Bluetooth communication standard, WLAN, and/or 3GPP standard, etc. After receiving the navigation alarm signals, the processing units 1051 of the server-based electronic devices 105A and 105B can respectively control the communication units 1052 to generate and push different Bluetooth alarm signals/packets to the client-based electronic device(s) 110A and client-based electronic device(s) 110B, so that the client-based electronic device(s) 110A and client-based electronic device(s) 110B can respectively play corresponding voice alarms for the user UA and driver UB when receiving the Bluetooth alarm signals/packets.

In addition, in other embodiments, the user UA or driver UB can operate his/her server-based portable device to make the processing unit 1051 control the communication unit 1052 sending detection activation signals (via Bluetooth signals/packets) to the client-based electronic device(s) 110A or client-based electronic device(s) 110B. The client-based electronic device(s) 110A for example can be used to detect the angle information (angle of arrival/departure) of the Bluetooth signal(s) transmitted from any neighboring client-based electronic device(s) of other users, e.g. the client-based electronic device(s) 110B for the driver UB when the client-based electronic device(s) 110A is within the signal transmission/reception range of the client-based electronic device(s) 110B. Based on the detected angle information of the signal(s), either the client-based electronic device(s) 110A or the server-based electronic device 105A can calculate the rotation angle information of the user UA relative to the driver UB to generate head pose direction estimation. If detecting that the signal power of the client-based electronic device(s) 110B becomes larger than a particular threshold and also the generated head pose direction estimation indicates that no angle changes for a specific time period, then the server-based electronic device 105A may determine that a traffic accident may occur and then control the client-based electronic device(s) 110A to play audio alarm messages for the user UA. It should be noted that the operation of determine whether the driver UB collides with the user UA is performed based on the Bluetooth signal power transmitted between the client-based electronic device(s) 110A and client-based electronic device(s) 110B and also based on the rotation angle information of the client-based electronic device(s) 110A (i.e. the user UA) relative to the client-based electronic device(s) 110B (i.e. the driver UB). In addition, the above-mentioned operations for the user UA can be applied for the driver UB; other modifications all obey the spirits of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied into a server-based portable device which is successfully paired with and security-connected with at least one client-based portable device that is to be carried or worn by a user, comprising:
    receiving rotation angle information of the at least one client-based portable device from the at least one client-based portable device, the rotation angle information is calculated by the at least one client-based portable device according to a specific wireless communication standard between a single one wireless communication locator station disposed at a specific location and the at least one client-based portable device when the at least one client-based portable device is within a signal range of the single one wireless communication locator station, the rotation angle information being calculated based on an angle of arrival or an angle of departure of a radio-frequency signal of the specific wireless communication standard between the single one wireless communication locator station and the at least one client-based portable device;
    generating a head pose direction estimation according to the calculated rotation angle information; and
    only when the head pose direction estimation indicates that a user turns a face towards the single one wireless communication locator station, receiving at least one packet signal transmitted from the single one wireless communication locator station without sending a request to ask for the at least one packet signal, and then determining whether to transfer the at least one packet signal from the server-based portable device to the at least one client-based portable device according to a data filter policy.

2. The method of claim 1, wherein the specific wireless communication standard supports Bluetooth communication direction finding function; the at least one client-based portable device is at least one Bluetooth audio device or at least one Bluetooth headset; the server-based portable device is a mobile phone device or a wearable electronic device; the at least one packet signal is at least one audio Bluetooth packet.

3. The method of claim 1, wherein the data filter policy comprises at least one of user-favorite shop information, user-favorite product information, logistics information, purchase history information, on-sale information, user-interest information, and user-habit information.

4. An electronic device applied into a server-based portable device which is successfully paired with and security-connected with at least one client-based portable device that is to be carried or worn by a user, comprising:
    a communication unit, for receiving rotation angle information of the at least one client-based portable device from the at least one client-based portable device, the rotation angle information is calculated by the at least one client-based portable device according to a specific wireless communication standard between a single one wireless communication locator station disposed at a specific location and the at least one client-based portable device when the at least one client-based portable device is within a signal range of the single one wireless communication locator station, the rotation angle information being calculated based on an angle of arrival or an angle of departure of a radio-frequency signal of the specific wireless communication standard between the single one wireless communication locator station and the at least one client-based portable device; and
    a processing unit, for generating a head pose direction estimation according to the calculated rotation angle information; and
    wherein only when the head pose direction estimation indicates that a user turns a face towards the single one wireless communication locator station, the processing unit controls the communication unit to receive at least one packet signal transmitted from the single one wireless communication locator station without sending a request to ask for the at least one packet signal, and then determine whether to transfer the at least one packet signal from the server-based portable device to the at least one client-based portable device according to a data filter policy.

5. The electronic device of claim 4, wherein the specific wireless communication standard supports Bluetooth communication direction finding function; the at least one client-based portable device is at least one Bluetooth audio device or at least one Bluetooth headset; the server-based portable device is a mobile phone device or a wearable electronic device; the at least one packet signal is at least one audio Bluetooth packet.

6. The electronic device of claim 4, wherein the data filter policy comprises at least one of user-favorite shop information, user-favorite product information, logistics information, purchase history information, on-sale information, user-interest information, and user-habit information.

7. An electronic device applied into a server-based portable device which is successfully paired with and security-connected with at least one client-based portable device that is to be carried or worn by a user, comprising:
    a communication unit, for receiving rotation angle information of the at least one client-based portable device from the at least one client-based portable device, the rotation angle information is calculated by the at least one client-based portable device according to a specific wireless communication standard between a single one wireless communication locator station disposed at a specific location and the at least one client-based portable device when the at least one client-based portable device is within a signal range of the single one wireless communication locator station, the rotation angle information being calculated based on an angle of arrival or an angle of departure of a radio-frequency signal of the specific wireless communication standard between the single one wireless communication locator station and the at least one client-based portable device; and a processing unit, coupled to the communication unit, for generating a head pose direction estimation according to the calculated rotation angle information; and wherein only when the head pose direction estimation indicates that a user turns a face towards the single one wireless communication locator station, the processing unit controls the communication unit to send at least one audio navigation signal from the server-based portable device to the at least one client-based portable device according to a specific suggestion route, which is generated from a map navigation software/mobile application executed on the server-based portable device based on a user command.

8. The electronic device of claim 7, wherein the at least one audio navigation signal is used by the at least one client-based portable device to play voices to for the user to give the user hints on whether to move forward/backward or turn right/left when the user turns the face towards the single one wireless communication locator station to perform turn-by-turn navigation without using audio navigation of the map navigation software/mobile application.

\* \* \* \* \*